US011722465B2

(12) United States Patent
Singleton, IV et al.

(10) Patent No.: US 11,722,465 B2
(45) Date of Patent: *Aug. 8, 2023

(54) PASSWORD ENCRYPTION FOR HYBRID CLOUD SERVICES

(71) Applicant: Citrix Systems, Inc., Fort Lauderdale, FL (US)

(72) Inventors: Leo C. Singleton, IV, Fort Lauderdale, FL (US); Andy Cooper, Royston (GB)

( * ) Notice: Subject to any disclaimer, the term of this patent is extended or adjusted under 35 U.S.C. 154(b) by 33 days.

This patent is subject to a terminal disclaimer.

(21) Appl. No.: 16/519,243

(22) Filed: Jul. 23, 2019

(65) Prior Publication Data

US 2019/0349341 A1 Nov. 14, 2019

Related U.S. Application Data

(63) Continuation of application No. 15/149,707, filed on May 9, 2016, now Pat. No. 10,432,592.
(Continued)

(51) Int. Cl.
*H04L 29/06* (2006.01)
*H04L 9/40* (2022.01)
(Continued)

(52) U.S. Cl.
CPC ........ *H04L 63/0435* (2013.01); *G06F 21/554* (2013.01); *G06F 21/6209* (2013.01);
(Continued)

(58) Field of Classification Search
CPC ............ H04L 63/0435; H04L 63/0815; H04L 63/062; H04L 63/083; H04L 63/08; G06F 21/6209
(Continued)

(56) References Cited

U.S. PATENT DOCUMENTS 8,613,070 B1 12/2013 Borzycki et al.
8,863,255 B2 10/2014 Zarfoss, III et al.
(Continued)

FOREIGN PATENT DOCUMENTS

JP H11-110354 A 4/1999
JP 2006-033198 A 2/2006
(Continued)

*Primary Examiner* — Jeffrey C Pwu
*Assistant Examiner* — Samuel Ambaye

(57) ABSTRACT

Methods, systems, computer-readable media, and apparatuses may provide password encryption for hybrid cloud services. A workspace cloud connector internally residing with an entity may intercept user credentials associated with an internal application being transmitted to an external cloud service. The workspace cloud connector may generate an encryption key and encrypt the user credentials via a reversible encryption methodology. The workspace cloud connector may encrypt the encryption key using an irreversible encryption methodology (e.g., use a hashing function to produce a first hash). The workspace cloud connector may transmit the encrypted user credentials and the first hash to a virtual delivery agent via a first path (e.g., via the external cloud service). In response, the workspace cloud connector may receive an address of the virtual delivery agent and, using the address, may send the encryption key to the virtual delivery agent via a second path different from the first path.

20 Claims, 9 Drawing Sheets

Related U.S. Application Data

(60) Provisional application No. 62/159,320, filed on May 10, 2015.

(51) Int. Cl.
*H04L 9/08* (2006.01)
*G06F 21/55* (2013.01)
*G06F 21/62* (2013.01)
*G06F 21/44* (2013.01)

(52) U.S. Cl.
CPC .......... *H04L 9/0827* (2013.01); *H04L 63/062* (2013.01); *H04L 63/08* (2013.01); *H04L 63/083* (2013.01); *H04L 63/0815* (2013.01); *G06F 21/44* (2013.01)

(58) Field of Classification Search
USPC .......................................................... 713/153
See application file for complete search history.

(56) References Cited

U.S. PATENT DOCUMENTS

| | | | |
|---|---|---|---|
| 2005/0198379 A1* | 9/2005 | Panasyuk | H04L 69/329 709/239 |
| 2007/0237327 A1 | 10/2007 | Taylor et al. | |
| 2010/0058064 A1* | 3/2010 | Kirovski | H04L 63/0853 713/176 |
| 2013/0166918 A1 | 6/2013 | Shahbazi et al. | |
| 2013/0305054 A1* | 11/2013 | Burchett | H04L 63/062 713/185 |
| 2014/0082349 A1* | 3/2014 | Zarfoss, III | H04L 9/321 713/155 |
| 2014/0108665 A1* | 4/2014 | Arora | H04L 65/1069 709/227 |

FOREIGN PATENT DOCUMENTS

| | | |
|---|---|---|
| JP | 2011-238289 A | 11/2011 |
| JP | 2013-533535 A | 8/2013 |
| WO | 2004/027618 A1 | 4/2004 |
| WO | 2011/149704 A1 | 12/2011 |

\* cited by examiner

PASSWORD ENCRYPTION FOR HYBRID CLOUD SERVICES

RELATED APPLICATIONS

This application is a continuation of U.S. application Ser. No. 15/149,707 filed May 9, 2016, now allowed, and claims the benefit of U.S. Provisional Patent Application No. 62/159,320 filed May 10, 2015 and entitled "Password Encryption For Hybrid Cloud Services." Each application is entirely incorporated herein by reference.

FIELD

Aspects of the disclosure relate to computer hardware and software. In particular, one or more aspects of the disclosure generally relate to computer hardware and software for protecting passwords and/or other information in a hybrid cloud service.

BACKGROUND

Information security is of paramount importance in providing cloud services to one or more users. A hybrid cloud service is a cloud computing environment in which some resources of an entity are externally managed and located within the cloud of a cloud service provider while other resources of the entity are internally managed by the entity and located within an its own servers or other computing devices. In some instances, a user (e.g., an employee of the entity) may need to access, from a remote location, an internally managed application or other resource, which requires the user's credentials (e.g., password) and is located in one of the entity's computing devices. In such instances, the user's password may be transmitted from the user's remote device to the internal application or resource via an external cloud provided by the cloud service provider. As a result, the cloud service provider may disadvantageously have access to the user's credentials. Further, if the cloud service provider indirectly routes the user's credentials, as cloud service providers relay thousands of communications at any given point in time, an unintended recipient may also obtain the user's credentials.

Current solutions for protecting a user's credential in a cloud service environment include security assertion markup language (SAML), open standard for authorization (OAuth) and OpenID that handle assertions of identity and access control requests. However, in each of these solutions, there is redundant user administration that results in a poor user experience. That is, the user is redundantly asked to provide his or her user credentials once he or she obtains access to the internal application or resource. For example, the user at the remote site (e.g., a login gateway) may be asked for user credentials of an internal application or resource and, once connected to the internally managed application, may again be asked to provide the user's credentials of the internal application or resource so that the cloud service provider does not have access to the user credentials of the application, which results in a poor user experience.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to methods, computer-readable media, apparatuses and systems for protecting sensitive data such as user credentials (e.g., user passwords) in a hybrid cloud service computing environment. As an example, a workspace cloud connector internally residing with an entity may receive or intercept user identity credentials being transmitted from a login gateway to an external cloud service. The workspace cloud connector may generate an encryption/decryption key and encrypt the user identity credentials using the encryption/decryption key via a reversible encryption methodology (e.g., advanced encryption standard (AES) encryption). Additionally, the workspace cloud connector may encrypt the encryption/decryption key using an irreversible encryption methodology. For instance, the workspace cloud connector may generate a first hash of the encryption/decryption key using, for example, a secure hash algorithm (SHA) such as SHA-2. The workspace cloud connector may transmit the encrypted password and the first hash of the encryption/decryption key to a virtual delivery agent via the external cloud service (e.g., a first path). In response, the workspace cloud connector may receive an address of a virtual delivery agent residing on a destination gateway and, using the address, may send the encryption/decryption key to the virtual delivery agent via the login gateway and/or user device (e.g., a second path).

The external cloud service may send the encrypted password and the first hash of the encryption/decryption key to the virtual delivery agent of the destination gateway. The virtual delivery agent may store the encrypted password and the first hash of the encryption/decryption key in a mapping table. The virtual delivery agent may receive the encryption/decryption key from the user device and encrypt the encryption/decryption key using the irreversible encryption methodology (e.g., generate a second hash of the encryption/decryption key using SHA-2) and compare the second hash with the first hash. If they match, then the virtual delivery agent may decrypt the encrypted password using the encryption/decryption key to produce the password for use with the internal application or resource.

In one or more embodiments, a system may include a gateway, within an internal cloud, and a workspace cloud connector. The gateway may be configured to receive messages from a user device and configured to forward the messages to a computing device associated with an external cloud. The workspace cloud connector may be communicatively coupled to the gateway and configured to intercept a first message of the messages being forwarded to the computing device associated with the external cloud. The intercepting may be based on the first message including user identity credentials for an internal application. The workspace cloud connector may be configured to generate an encryption key, encrypt the user identity credentials using the encryption key, and generate a first hash of the encryption key. The workspace cloud connector may be configured to transmit a second message including the encrypted user identity credentials and the first hash of the encryption key to the computing device associated with the external cloud. In response to transmitting, the workspace cloud connector may receive a routing address of a virtual delivery agent from the computing device associated with the external cloud, and transmit a third message including the encryption key and the routing address of the virtual delivery agent to the user device.

In one or more embodiments, an apparatus, within an internal cloud, may include a processor and a computer readable medium storing instructions that, when executed by the processor, configure the apparatus to perform one or more steps. For instance, the apparatus may intercept a first message being sent from a user device and to a computing associated with an external cloud. The intercepting may be based on the first message including user identity credentials associated with an application. The apparatus may generate an encryption key, encrypt the user identity credentials using the encryption key, and generate a first hash of the encryption key. The apparatus may transmit a second message including the encrypted user identity credentials and the first hash of the encryption key to the computing device associated with the external cloud. In response to the transmitting, the apparatus may receive a routing address of a virtual delivery agent from the external cloud, and transmit a third message including the encryption key and the routing address of the virtual delivery agent to the user device.

In one or embodiments, a computing device, within an internal cloud, may perform a method comprising one or more steps. For instance, the computing device may intercept a first message being sent from a user device and to a computing device associated with an external cloud. The intercepting may be based on the first message including user identity credentials associated with an internal application. The computing device may extract the user identity credentials, generate a random logon ticket, encrypt the user identity credentials using the random logon ticket, and generate a first hash of the random logon ticket. The computing device may transmit a second message including the encrypted user identity credentials and the first hash of the random logon ticket to the computing device associated with the external cloud. In response to the transmitting, the computing device may receive a routing address of the virtual delivery agent from the computing device associated with the external cloud, and transmit a third message including the random logon ticket and the routing address of the virtual delivery agent to the user device.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards password encryption for hybrid cloud services. Workspace cloud connectors may facilitate secure transfer of a user's identity credential over an external cloud such that the external cloud does not have access to a plaintext version of the user's identity credentials. In this way, security of the user's identity credentials is maintained.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
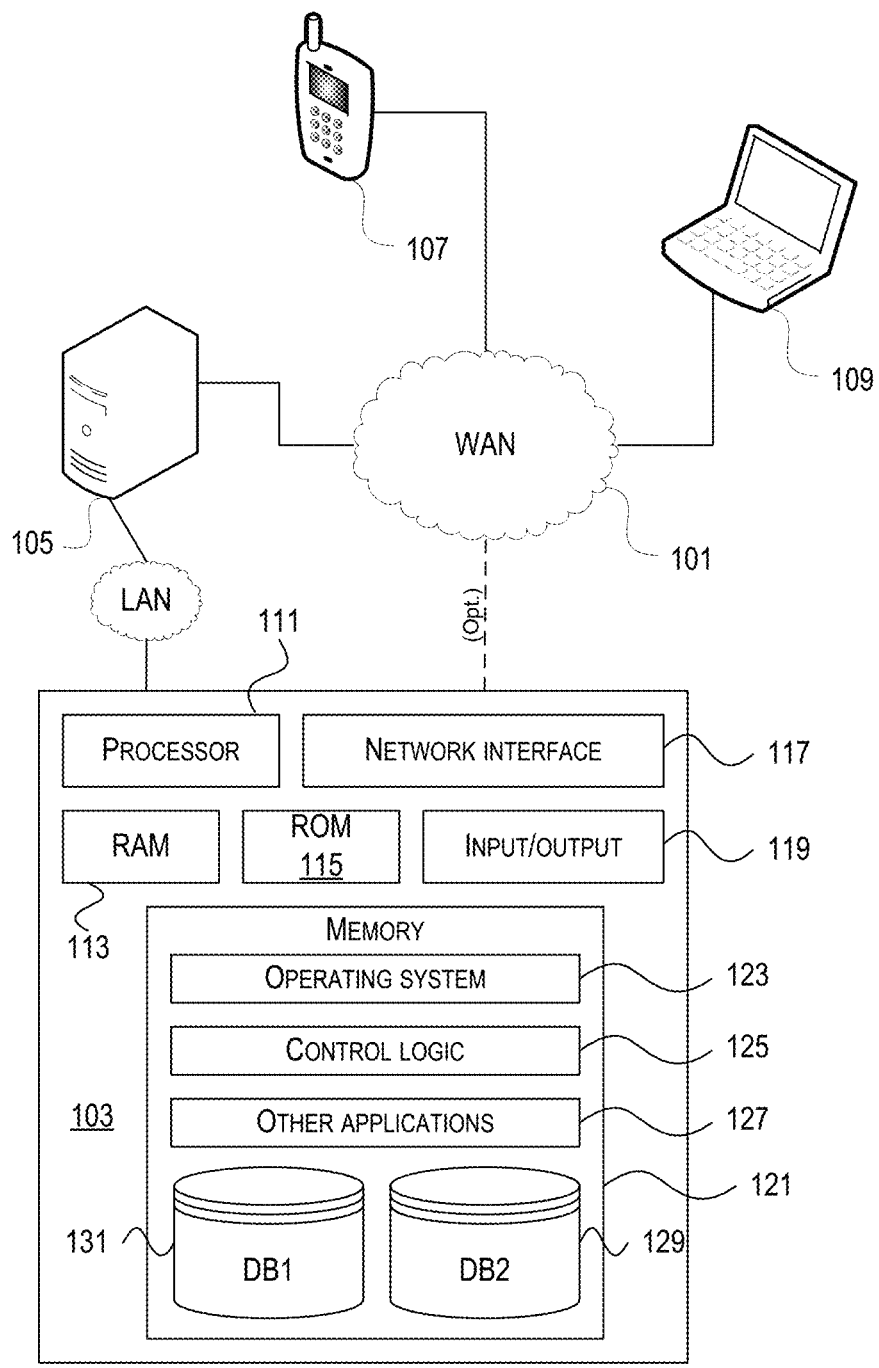
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network.

Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
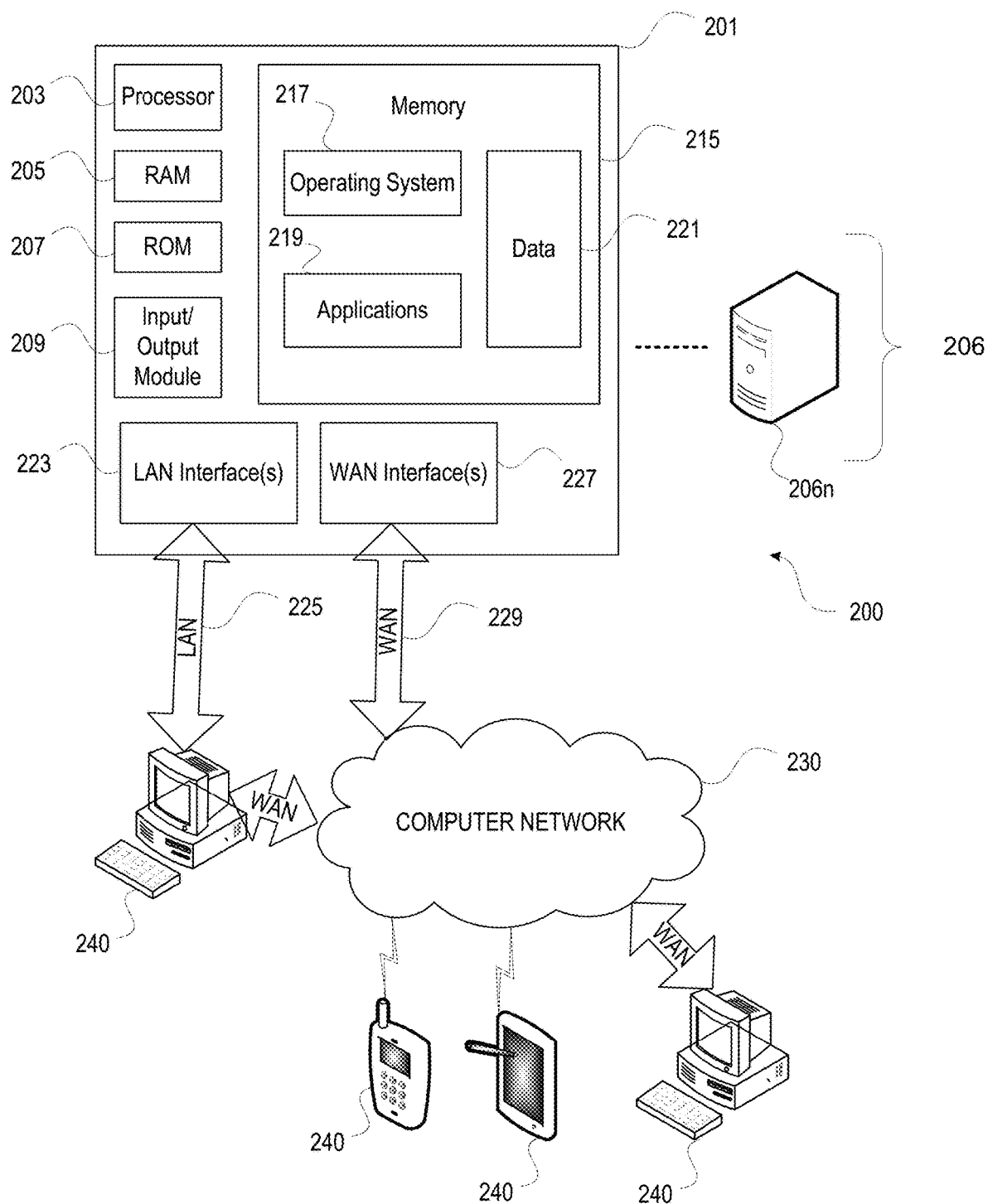
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
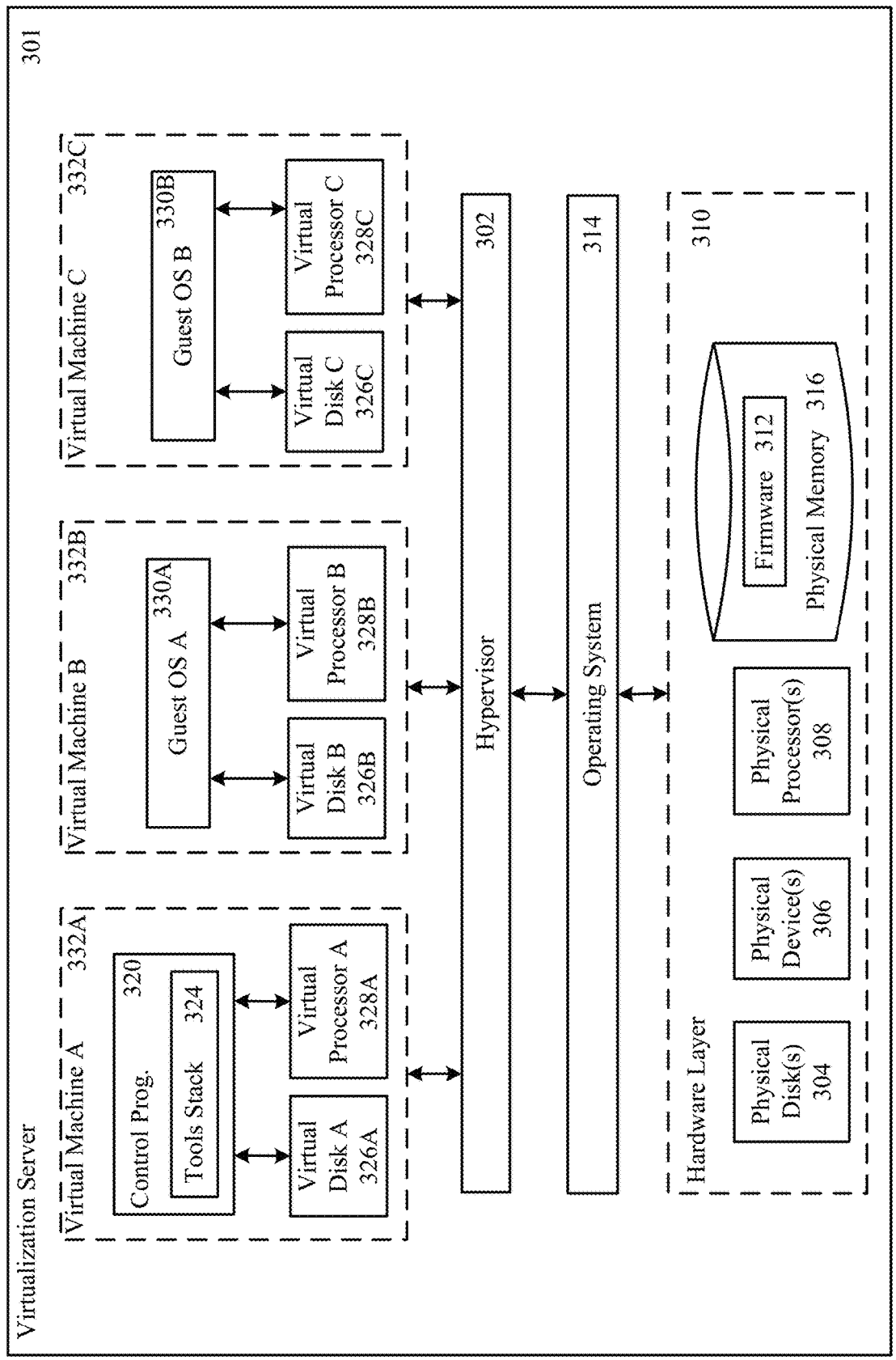
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
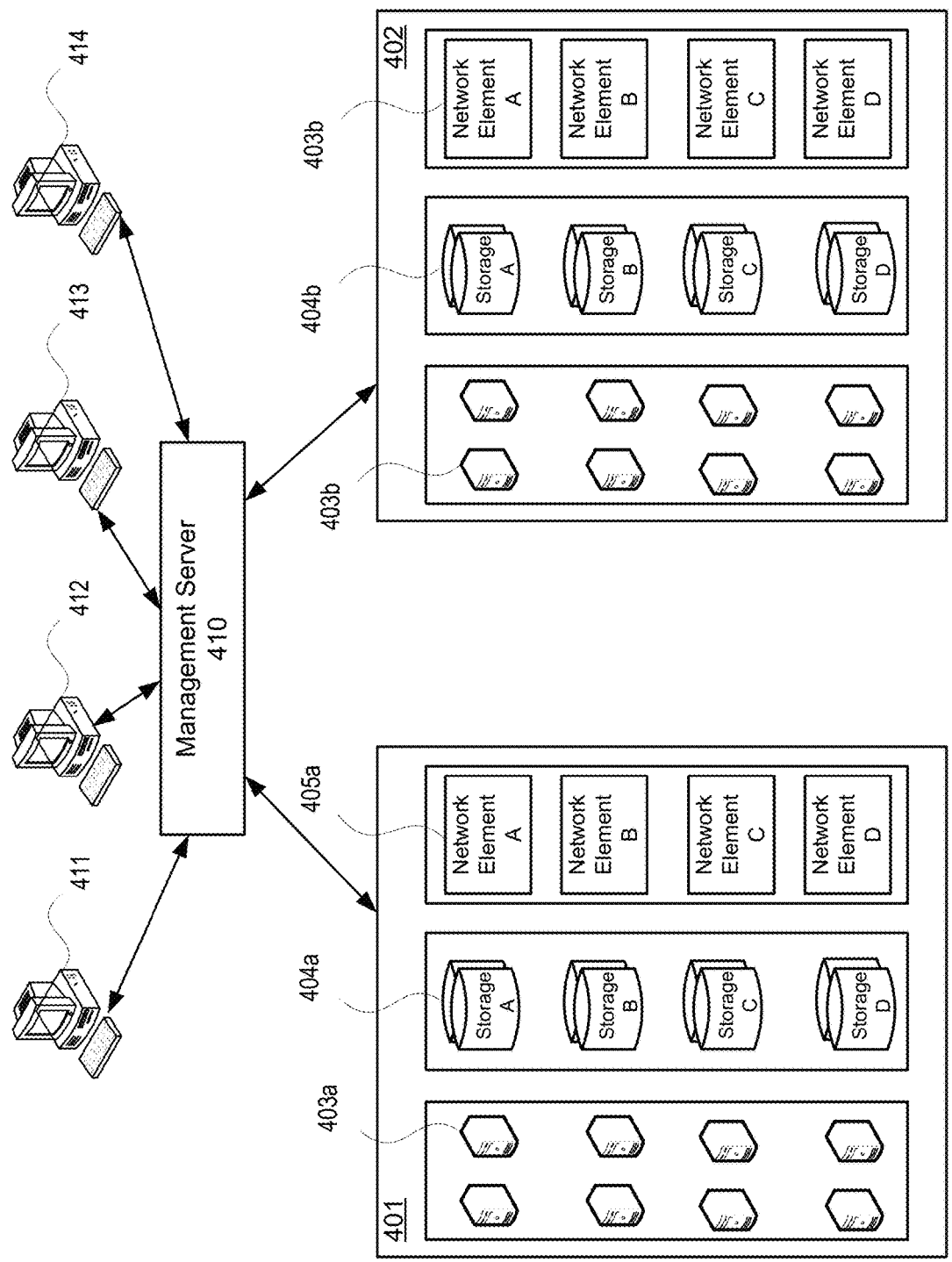
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
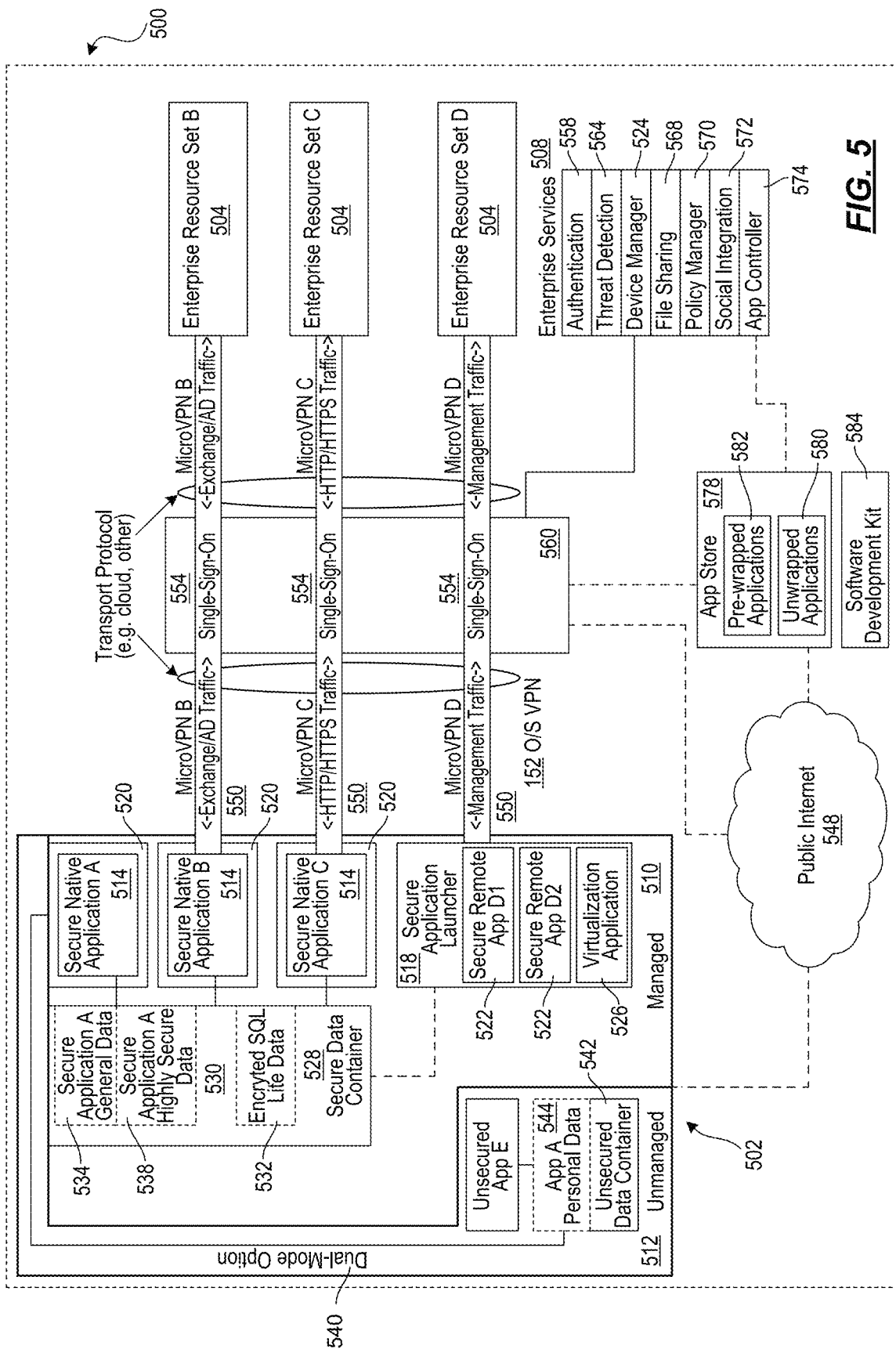
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
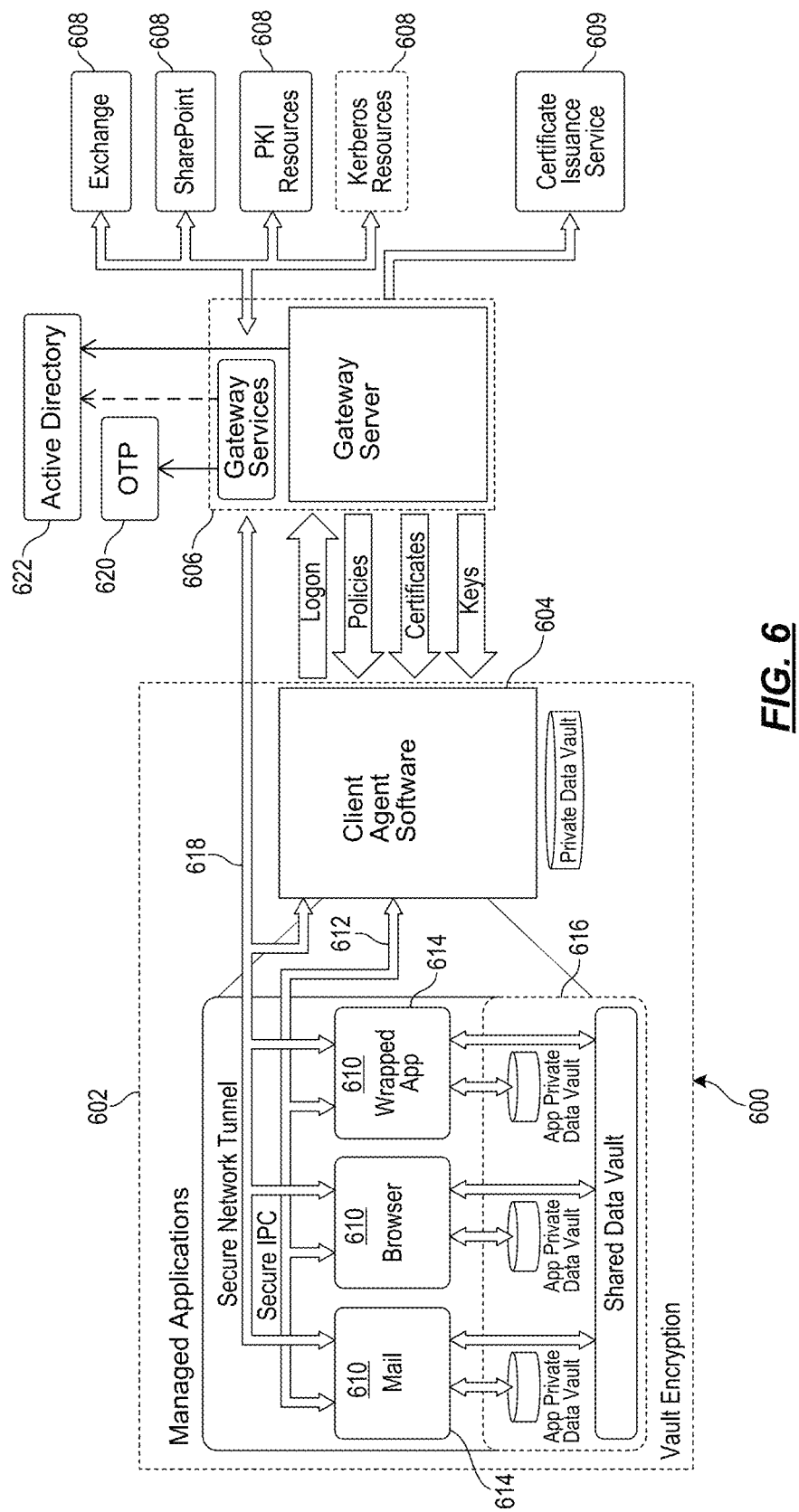
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PM) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PM protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Password Encryption Management System

Figure 7:
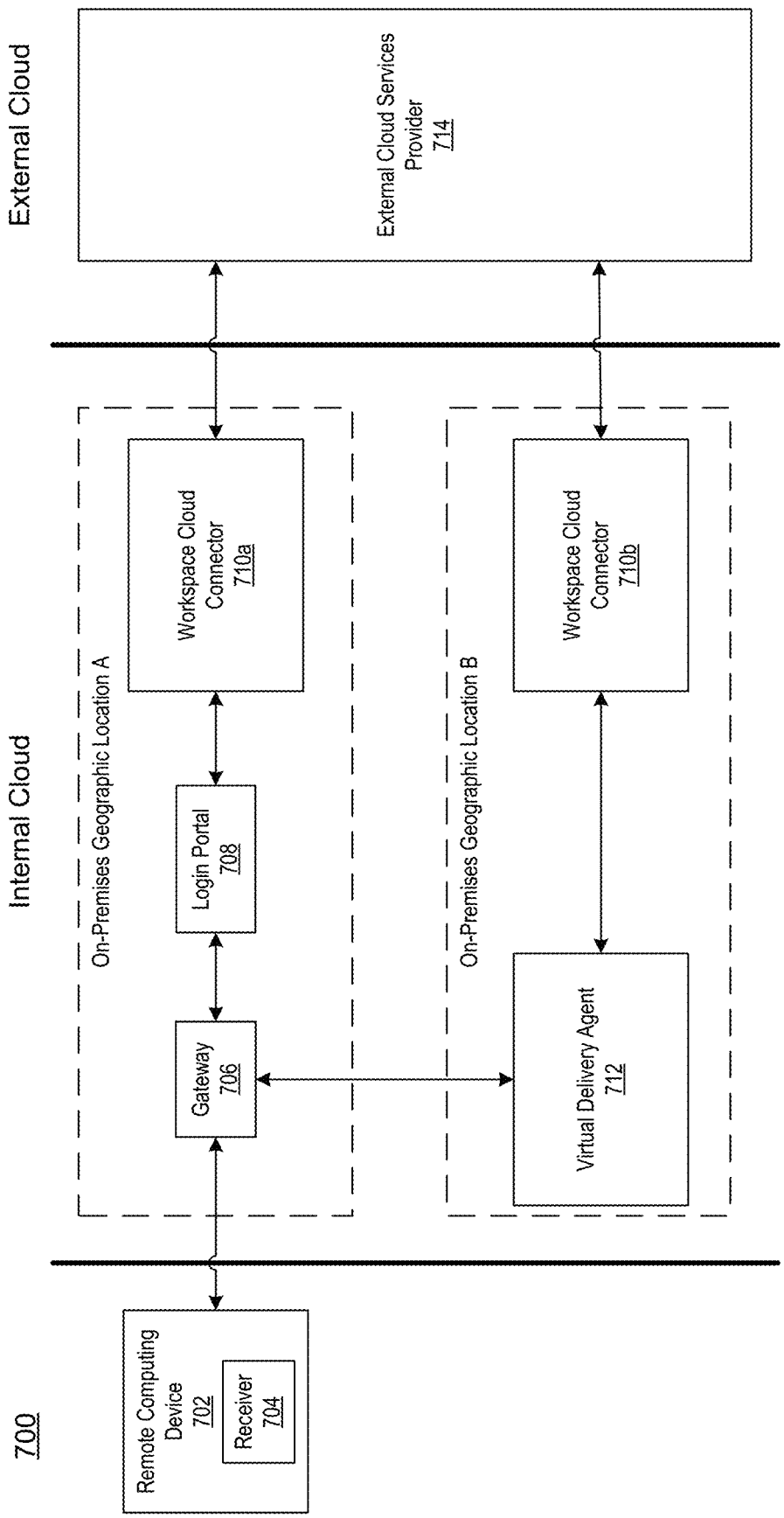
FIG. 7 depicts an illustrative system that may be used to implement one or more illustrative aspects described herein.

FIG. 7 depicts an illustrative system that may be used to implement one or more illustrative aspects described herein. The system 700 may be in the form of a hybrid cloud computing environment in which some resources of an entity are externally managed and located within the cloud of a cloud service provider while other resources of the entity are internally managed by the entity and located within an its own servers or other computing devices. As used herein, variations of the term "internal" may refer to resources and applications managed by an entity itself and/or stored on one or more computing devices controlled by the entity and not controlled by an external cloud service provider. As an example, a resource may be stored at an on-premises server of the entity for remote access by authorized users associated with the entity. For instance, a particular software application (e.g., an internal application) may be stored on a server controlled and managed by an employer, and may be accessed by one or more of its employees. As used herein, variations of the term "external" may refer to resources and applications managed by a cloud service provider and/or are stored on one or more computing devices controlled by the external cloud service provider. As an example, a resource may be stored at a cloud-based server of the cloud service provider for access by authorized users associated with the entity. In such an example, the resource may also be associated with the entity.

A user of a hybrid cloud computing environment (e.g., hybrid cloud computing environment 700) may wish to access an internal application installed on a geographically remote internal computing device. As an example, a user may, while visiting an office in London, wish to access an application installed on the user's work computer in Virginia. The user may connect and/or otherwise communicate with the internal application via an external cloud service. In some instances, the user may have to provider the user's credentials (e.g., name and password) to the internal application for authentication in order to gain access to the internal application. In such instances, the user's credentials may be reversibly encrypted and sent to the internal application via the external cloud service, which may then be decrypted and used by the internal application as will be discussed in further detail below.

The hybrid cloud computing environment 700 may include an external cloud services provider 714 to provide public cloud services. External cloud services provider 714 may include applications and/or other resources stored in its computing devices (not shown) that users can access over the Internet. External cloud services provider 714 may also transfer information from a particular internal computing device to another internal computing device at different premises of an entity that might not be part of external cloud services provider 714. As an example, a computing device that is part of a private cloud located at a particular geographic location may send information via the external cloud to another computing device that is also part of the private cloud of the entity (or may be a different private cloud of the entity) located at a different geographic location.

The hybrid cloud computing environment 700 may include a remote computing device 702, which may be a personal computer, laptop, tablet, smartphone, etc. and may include one or more components of a computing device discussed above. In some instances, remote computing device 702 may be the user's personal device (e.g., the user may own remote computing device 702). In such instances, remote computing device 702 might not be part of the internal cloud but may be able to login and/or otherwise access the internal cloud after the user has been authenticated. In other instances, remote computing device 702 may be owned by the entity managing and controlling the internal cloud (e.g., an employer-provided laptop). In such instances, when the user connects to remote computing device 702 to a terminal at the premises of the entity, remote computing device 702 may be part of the internal cloud. Otherwise, when the user uses remote computing device 702 outside of the premises of the entity (e.g., at the user's home), remote computing device 702 might not be part of the internal cloud but may be able to login and/or otherwise access the internal cloud after the user has been authenticated (e.g., via a virtual private network (VPN) connection).

The remote computing device 702 may include a receiver 704, which may be a client software installed on remote computing device 702. Receiver 704 may enable remote computing device 702 to access internal and/or external cloud services. As an example, remote computing device 702 may, using receiver 704, securely access applications, virtual desktops and data stored in the internal and/or external clouds. In one example, receiver 704 may be a Citrix Receiver developed by Citrix Systems, Inc. of Ft. Lauderdale, Fla.

The hybrid cloud computing environment 700 may include a gateway 706, which may provide a unified frontend (or interface between the user and the backend) for all applications. Gateway 706 may communicate with remote computing device 702 via receiver 704, authenticate the remote computing device 702, and establish a secure connection with remote device 702. As an example, gateway 706 and receiver 704 may establish a secure virtual private network connection. In one example, gateway 706 may be a NetScaler Gateway developed by Citrix Systems, Inc.

Gateway 706 may connect remote computing device 702 and receiver 704 with a login portal 708. Login portal 708 may be a website for the user to enter the user's identity credentials (e.g., enter login information such as username and password) to access the internal and/or external applications, desktops and resources of the entity. Login portal 708 may be provided to remote computing device 702 via an internal webserver of the entity. Login portal 708 might not be provided by an external webserver so that users do not have to enter their identity credentials in plaintext (e.g., in an unencrypted or un-obfuscated form) to the external webserver (e.g., external cloud service provider 714). In one example, login portal 708 may be a Citrix StoreFront developed by Citrix Systems, Inc.

The internal cloud of the hybrid cloud computing environment 700 may include a first workspace cloud connector 710a, which may intercept messages being sent from the internal cloud to the external cloud. For instance, when one of remote computing device 702, receiver 704, gateway 706, or login portal 708 (e.g., webserver) attempt to transmit a message including the user's identity credential (e.g., a password) to external cloud service provider 714, first workspace cloud connector 710*a* may intercept the message so that the message is not yet sent to external cloud services provider 714. In one or more arrangements, first workspace cloud connector 710*a* may be configured to intercept each (e.g., all messages) transmitted from one or more of remote computing device 702, receiver 704, gateway 706, or login portal 708. In one or more other arrangements, first workspace cloud connector 710*a* may intercept only those messages containing user identity credentials. In such arrangements, the messages may include a flag in e.g., a header of the message indicating that the message contains user identity credentials so that first workspace cloud connector 710*a* may identify messages having the header as being messages it will intercept. First workspace cloud connector 710*a* may extract and remove the user's identity credentials from the message, which it may then encrypt using an encryption key generated by first workspace cloud connector 710*a*. Further, first workspace cloud connector 710*a* may generate a hash of the encryption key and send a message including both the user's encrypted identity credentials and the hash of the encryption key to external cloud service provider 714 (e.g., a first path) as will be discussed in further detail below. Additionally, first workspace cloud connector 710*a* may, once it receives an address of a virtual delivery agent 712 from the external cloud service provider 714, send the encryption key to the virtual delivery agent 712 via the login portal 708 and gateway 706 (e.g., a second path), which will also be discussed in further detail below.

The internal cloud of the hybrid cloud computing environment 700 may include a second workspace cloud connector 710*b*, which may relay messages received from external cloud service provider 714 to virtual delivery agent 712. The relayed messages may include the user's encrypted identity credentials and the hash of the encryption key. As a result of receiving the relayed messages and messages sent from remote computing device 702 that include the encryption key, virtual delivery agent 712 may determine whether it should decrypt the encryption key. For instance, virtual delivery agent 712 may generate a hash of the received encryption key and compare the generated hash with the hash received in the relayed message. If they match, virtual delivery agent 712 may decrypt the user's encrypted identity credentials using the encryption key to obtain the user's identity credentials for use with an internal application or resource. Each of workspace cloud connectors 710, virtual delivery agent 712, and cloud service provider 714 may be provided via one or more computing devices (not shown) communicatively connected with one another.

In one or more arrangements, gateway 706, login portal 708 and first workspace cloud connector 710*a* may each (e.g., all) be geographically located at an internal on-premises geographic location A (e.g., the London office following the above example). Virtual delivery agent 712 and second workspace cloud connector 710*b* may be geographically located at different on-premises location B (e.g., the Virginia office following the above example). In one or more other arrangements, gateway 706, login portal 708, first workspace cloud connector 710*a*, second workspace cloud connector 710*b*, and virtual delivery agent 712 may each (e.g., all) be geographically located at the same internal on-premises location of the entity. In such arrangements, the functions and features of first workspace cloud connector 710*a* and second workspace cloud connector 710*b* may be combined to form a single workspace cloud connector.

Figure 8:
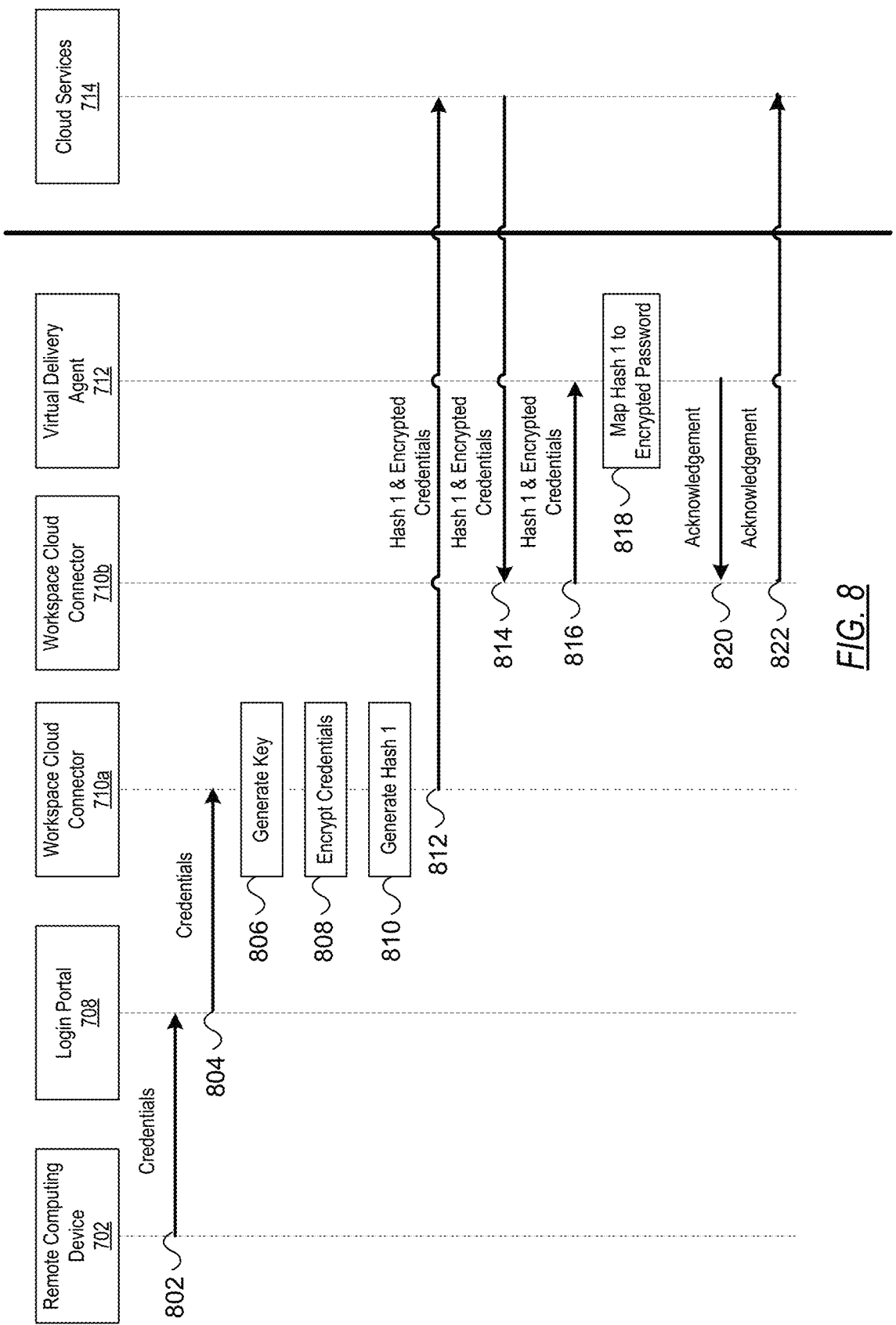
FIGS. 8-9 depict an illustrative message flow to securely transmit user identity credentials in accordance with one or more illustrative aspects described herein.
Figure 9:
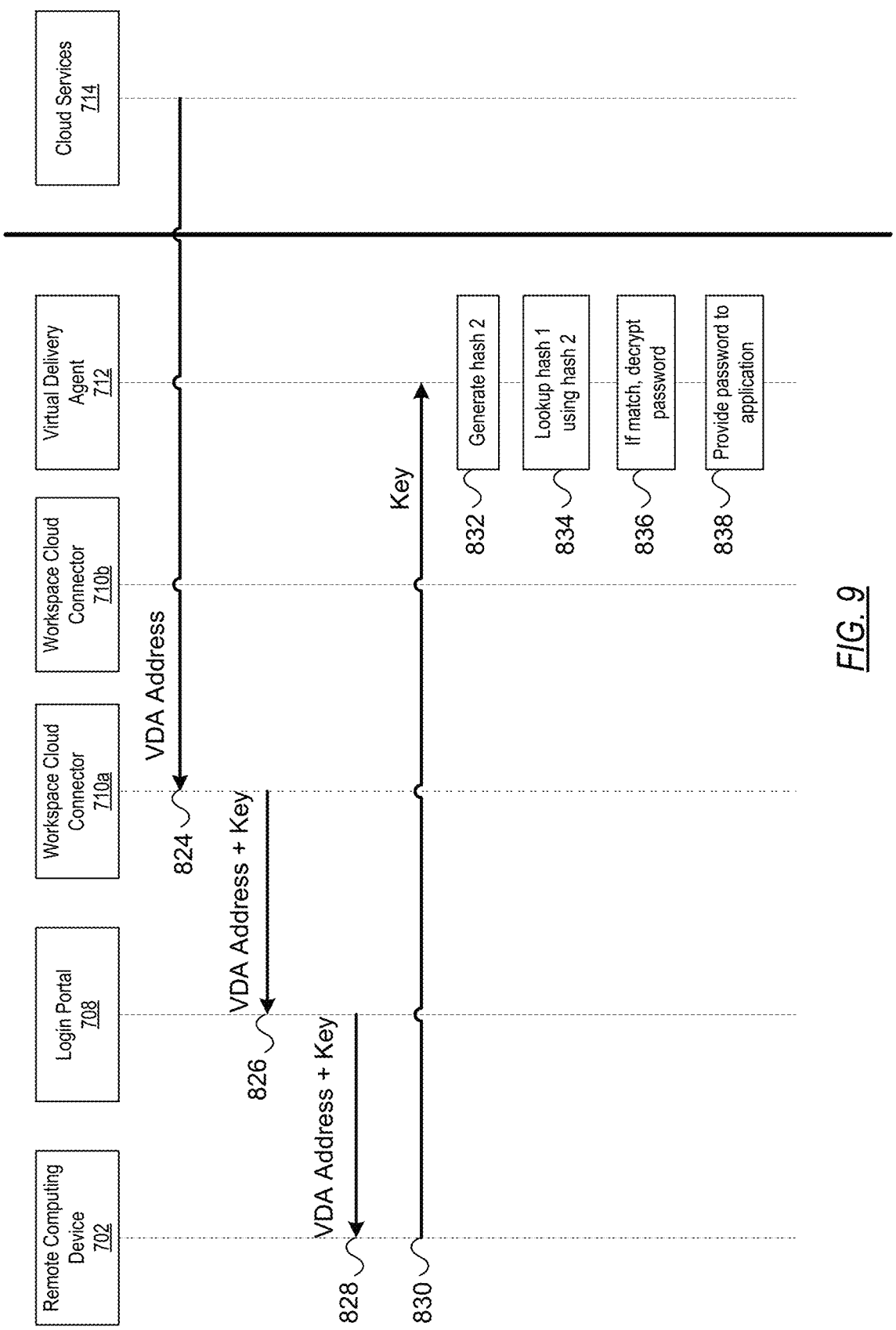

FIGS. 8-9 depict an illustrative message flow to securely transmit user identity credentials through an external cloud in a manner such that the external cloud might not have access to the credentials according to one or more illustrative aspects discussed herein. In one or more embodiments, the steps of FIGS. 8-9 and/or one or more steps thereof may be performed by one or more computing devices. In other embodiments, the method illustrated in FIGS. 8-9 and/or one or more steps thereof may be embodied in computer-executable instructions that are stored in a computer-readable medium, such as a non-transitory computer-readable memory. In some instances, one or more of the steps of FIGS. 8-9 may be performed in a different order. In some instances, one or more of the steps of FIGS. 8-9 may be omitted and/or otherwise not performed.

The steps in the example message flow diagram of FIGS. 8-9 describe a method of securely transmitting a user's identity credentials from remote computing device 702, through external cloud 714, to an internal application executed via virtual delivery agent 712 of an internal computing device. In some instances, the internal application may only accept a particular form of identity credential such as a username and password. In such instances, OAuth and SAML identity assertions might not be able to be used by the internal application to authenticate the user. Because the user's login gateway (e.g., gateway 706) might not be the same gateway where a virtual desktop infrastructure (VDI) is located, if OAuth or SAML are used, the user enters the user's identity credentials twice, once to login to the gateway and then again to access the internal application because the internal application might not accept OAuth or SAML identity assertions used by the external cloud services. However, as will be discussed in detail below, by using the secure transmission method described in the flow diagram of FIGS. 8-9, users may enter their credentials once to access the login gateway, and those credentials may be securely transmitted via external cloud services to the internal application. Because users' identity credentials are of a form acceptable by the internal application, the internal application may grant the users access to it after authenticating and/or otherwise verifying the users identity credentials. As a result, users may enter their identity credentials once. That is, they might not have to redundantly enter their identity credentials a second time thereby enhancing the users' experience.

The message flow may begin at step 802 in which remote computing device 702 may receive identity credentials from a user and transmit the user's identity credentials to login portal 708. The user's credentials may be one or more of a username, password, personal identification number (pin), biometric data (e.g., a fingerprint, facial picture, voice recording, etc.), or any data used for authentication to access a particular internal application or resource. Following the above London/Virginia example, the user and remote computing device 702 may be in an entity's London office and the gateway associated with the VDI may be located in the Virginia office. For instance, the user may need to remotely access, while in the London office, an internal application installed on the user's work computer located in the Virginia office. Thus, the user may enter the user's identity credentials for the internal application at remote computing device 702 for transmission to login portal 708.

After authenticating the user and remote computing device 702, login portal 408 may, at step 804, transmit the user's identity credentials to first workspace cloud connector 710*a* located on an entity premises (e.g., part of the entity's internal cloud services). In some instances, login portal 708 may be intending to transmit the user's identity credentials to external cloud service provider 714. In such instances, first workspace cloud connector 710*a* may identify the messages or transmissions that include identity credentials and intercept those messages or transmissions so that the unencrypted identity credentials are not sent to external cloud service provider 714. First workspace cloud connector 714 may identify such messages by inspecting/parsing each message for the identity credentials or determining whether the message includes a flag indicating that the message includes identity credentials. In some instances, login portal 708 may be intending to transmit the user's identity credentials to first workspace cloud connector 710a and might not be intending to transmit such information directly to external cloud service provider 714. In such instances, first workspace cloud connector 710a might not intercept messages intended to be sent directly to external cloud service provider 714. For each message or transmission that first workspace cloud connector 710a identifies as including identity credential information, first workspace cloud connector 710a may parse and extract the user's identity credentials to remove it from the message. Additionally, first workspace cloud connector 710a may prevent and/or otherwise actively block the message from being transmitted to external cloud service provider 714.

At step 806, first workspace cloud connector 710a may generate an encryption key for use in encrypting and decrypting the user's identity credentials. The key may be generated using a random key generator, a pseudo-random key generator, or any other key generator. As an example, the encryption key may be a securely-random 128-bit independent computing architecture (ICA) logon ticket. ICA may be a particular file type that allows users to store data with links between clients and servers so that a user can use a software application by connecting to a remote server without having the software actually installed on the client.

At step 808, first workspace cloud connector 710a may encrypt the user's identity credentials using the encryption key to produce encrypted identity credentials. The encryption mechanism used may be any reversible encryption mechanism such as an advanced encryption standard (AES). By having a reversible encryption mechanism, virtual delivery agent 712 may later decrypt the encrypted identity credential using the generated encryption key as will be discussed in further detail below. At step 810, first workspace cloud connector 710a may hash the generated encryption key to generate a first hash (e.g., hash 1). The first hash may be in the form of hash values, hash codes or hash sums. The first hash may be generated using any hash function or one-way encryption function such as, for example, SHA-2.

At step 812, first workspace cloud connector 710a may replace the user's identity credentials in the intercepted message with the user's encrypted identity credentials and the first hash of the encryption key, and may transmit the message to external cloud service provider 714. In some embodiments, first cloud connector 710a may generate a new message rather than modifying the intercepted message. The messages may be transmitted over any protocol. As an example, the message may be transmitted, using Citrix NFuse XML protocol developed by Citrix Systems, Inc., to the XenApp and Xendesktop controllers of the external cloud service provider, each of which was developed by Citrix Systems, Inc.

At step 814, external cloud services provider 714 may forward the message including the user's encrypted identity credentials and the first hash of the encryption key to the second workspace cloud connector 710b, which at step 816, may forward the message to the virtual delivery agent 712 residing on the entity's premises (e.g., on the internal cloud services). Since the user's identity credentials are encrypted, the external cloud services provider 714 might not be able to access an unencrypted version of the user's identity credentials and, thus, security is maintained. Additionally, at step 814, external cloud services provider 714 may use one or more routing policies, load-balancing, and a generic identifier of the user or remote computing device 702 (e.g., included in the received message) to determine which of multiple virtual delivery agents of route the message.

At step 818, virtual delivery agent 712 may generate a mapping of the first hash to the user's encrypted identity credentials. For instance, virtual delivery agent 712 may store the first hash and the encrypted password in a mapping table of a database accessible by virtual delivery agent 712. Because virtual delivery agent 712 may be receiving numerous (e.g., hundreds or even thousands of messages), the mapping of the first hash to the user's encrypted identity credential through use of the mapping table helps ensure that the appropriate first hash and encrypted identity credential are identified for use in comparing hashes and decrypting the encrypted identity credential as will be discussed in further detail below.

At step 820, an acknowledgement including a network address of virtual delivery agent 712 (also referred to herein as a VDA address) may be transmitted to second workspace cloud connector 710b, which may then forward the acknowledgement to external cloud services provider 714 at step 822. At step 824, external cloud services provider 714 may transmit the VDA address to first workspace cloud connector 710a. At step 826, first workspace cloud connector 710a may transmit the VDA address and the encryption key to login portal 708, which may, at step 828, forward the VDA address and the encryption key to remote computing device 702 (e.g., via gateway 706 and receiver 704). At step 830, remote computing device 702 may use the VDA address to transmit the encryption key to virtual delivery agent 712. The transmission may be sent via receiver 704 and gateway 706. The encryption key may be in the form of an ICA logon ticket. That is, the value or fields of the ICA logon ticket may be the encryption key. In other instances, the ICA ticket may include a separate field for the encryption key.

At step 832, virtual delivery agent 712 may hash the encryption key to generate a second hash of the encryption key (e.g., hash 2). The second hash may be in the same form as the first hash (e.g., hash values, hash codes or hash sums) and may be generated using the same hash function as was used to generate the first hash (e.g., SHA-2) in step 810. At step 834, virtual delivery agent 712 may use the generated second hash to lookup, in the mapping table, the first hash and the first hash's corresponding encrypted identity credentials by comparing the first hash with each hash in the mapping table until a match is found. If the second hash does not match any of the hashes stored in the table, virtual delivery agent 712 might not permit access (e.g., block access) to the internal application and may send a rejection message to remote computing device 702 for display to the user. Otherwise, if the second hash does match one of the hashes stored in the table (e.g., the first hash), virtual delivery agent 712 may, at step 836, identify the first hash's corresponding (e.g., mapped) encrypted identity credentials in the table using the first hash and may decrypt the user's encrypted identity credentials using the encryption key received in step 830 to produce the unencrypted version of the user's identity credentials (e.g., a plaintext version of the user's username and password). At step 838, virtual delivery agent 712 may provide the user's identity credentials to the internal application for authentication to create a user session. The internal application, which may be residing on a computing device in the internal cloud (e.g., the user's work computer in the Virginia office following the above example), may authenticate the user using the user's identity credentials and permit or deny access to the internal application based on the authentication.

Additionally or alternatively, rather than using the second hash to identify the first hash by comparing the second hash to each hash in the mapping table, a particular identifier (e.g., table row identifier) may be used. In such cases, virtual delivery agent 712 may generate the particular identifier when it stores the first hash and corresponding identity credentials in the mapping table and may append the identifier to the VDA address for transmission back to remote computing device 702 for forwarding to virtual delivery agent 712. Virtual delivery agent 712 may then use the identifier to lookup the first hash to compare with the second hash.

As a result of using the methodology of FIGS. 8-9, a user in an entity's London office may use remote computing device 702 to securely access an internal application in the Virginia office using an external cloud services provider. The user's identity credentials are securely transmitted to the internal application even when using external cloud services provider 714. The external cloud services provider 714 may receive the user's encrypted identity credentials but might not receive an unencrypted (e.g., plaintext) version of the user's identity credentials to maintain security. Further, the methodology enhances the user's experience as the user does not have to enter the user's identity credentials multiple times to access an internal application that uses particular form of identity credentials (e.g., username and password) and might not use a different form of identity credentials (e.g., SAML or OAuth identity assertions). Additionally, in the event the encryption key is sent to the wrong virtual delivery agent, that virtual delivery agent might not be able to decrypt the user's encrypted identity credentials since the encryption key takes a complete different path to the virtual delivery agent 712 than the user's identity credentials, which is sent to the correct virtual delivery agent. Similarly, in the event the user's encrypted identity credentials are sent to the wrong virtual delivery agent, that virtual delivery agent might not be able to decrypt the user's encrypted identity credentials.

In one or more additional or alternative arrangements, first workspace cloud connector 710a may replace the user's identity credentials with a randomly-generated token and hold the user's identity credential in a credential wallet stored at first workspace cloud connector 710a. The credential wallet may be replicated by each workspace cloud connector (e.g., second workspace cloud connector 710b). The message sent to external cloud service provider 714 may include the token rather than the user's encrypted identity credentials. Second workspace cloud connector 710b may use the token received from external cloud services provider 714 to lookup the user's identity credentials and provide the user's identity credentials to virtual delivery agent 712. As a result, the user's identity credentials (even in an encrypted form) might not be sent to external cloud service provider 714.

The above method described in FIGS. 8-9 may be applied (e.g., repeated) for each message intended on being sent to an external cloud by any user in a multi-user system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A method comprising:
   receiving, by a computing device, from a client device, plaintext user identity credentials that authorize access to an application via a virtual delivery agent;
   generating, by the computing device, a message to enable the access to the application via the virtual delivery agent, the message including a hash of an encryption key and encrypted user identity credentials generated by encrypting the plaintext user identity credentials using the encryption key; and
   transmitting, by the computing device, the message to enable the client device to access the application via the virtual delivery agent.

2. The method of claim 1, wherein the encryption key is a logon ticket.

3. The method of claim 1, wherein receiving of the plaintext user identity credentials comprises:
   receiving the plaintext user identity credentials within an unencrypted message being transmitted to the virtual delivery agent; and
   intercepting the unencrypted message by preventing delivery of the unencrypted message to the virtual delivery agent.

4. The method of claim 3, further comprising detecting that the unencrypted message contains plaintext user identity credentials, and wherein the interception of the unencrypted message is responsive to the detection.

5. The method of claim 1, wherein the user identity credentials include one or more of a username, a password, or biometric data.

6. The method of claim 1, wherein the computing device is a first computing device and the message is transmitted to a second computing device different from the first computing device, the second computing device configured to enable access to the application via the virtual delivery agent by a user of the client device.

7. The method of claim 1, further comprising transmitting the encryption key to the client device to enable the client device to access the application via the virtual delivery agent.

8. An apparatus comprising:
   one or more processors; and
   memory storing instructions, wherein execution of the instructions by the one or more processors causes the apparatus to:
      receive, from a client device, plaintext user identity credentials that authorize access to an application via a virtual delivery agent;
      generate a message to enable the access to the application via the virtual delivery agent, the message including a hash of an encryption key and encrypted user identity credentials generated by encrypting the plaintext user identity credentials using the encryption key; and
      transmit the message to enable the client device to access the application via the virtual delivery agent.

9. The apparatus of claim 8, wherein the encryption key is a logon ticket.

10. The apparatus of claim 8, wherein execution of the instructions by the one or more processors further causes the apparatus to:

receive the plaintext user identity credentials within an unencrypted message being transmitted to the virtual delivery agent; and intercept the unencrypted message by preventing delivery of the unencrypted message to the virtual delivery agent.

11. The apparatus of claim 10, wherein execution of the instructions by the one or more processors further causes the apparatus to detect that the unencrypted message contains plaintext user identity credentials, and wherein the interception of the unencrypted message is responsive to the detection.

12. The apparatus of claim 8, wherein the user identity credentials include one or more of a username, a password, or biometric data.

13. The apparatus of claim 8, wherein the apparatus is a first computing device and the message is transmitted to a second computing device different from the first computing device, the second computing device configured to enable access to the application via the virtual delivery agent by a user of the client device.

14. The apparatus of claim 8, wherein execution of the instructions by the one or more processors further causes the apparatus to transmit the encryption key to the client device to enable the client device to access the application via the virtual delivery agent.

15. An apparatus comprising:
one or more processors; and
memory storing instructions wherein execution of the instructions by the one or more processors causes the apparatus to:

detect a message in transit to a computing device, the message being configured to provide remote access to an application and including an unencrypted credential associated with a user;

prevent delivery of the message including the unencrypted credential to the computing device;

encrypt the credential using a logon ticket as an encryption key after prevention of the delivery of the message to the computing device; and transmit the encrypted credential to the computing device to enable the remote access to the application.

16. The apparatus of claim 15, wherein the credential comprises one or more of a username, password, or biometric data.

17. The apparatus of claim 15, wherein execution of the instructions, by the one or more processors, further causes the apparatus to transmit a hash of the logon ticket to the computing device.

18. The apparatus of claim 15, wherein execution of the instructions, by the one or more processors, further causes the apparatus to transmit the logon ticket to a client device used by the user.

19. The apparatus of claim 18, wherein the message is transmitted to the client device.

20. The apparatus of claim 15, wherein execution of the instructions, by the one or more processors, further causes the apparatus to generate the logon ticket using one of a random or pseudo-random number generator.

* * * * *